April 4, 1939.　　　G. H. MEINZER　　　2,152,748

METHOD OF RECOVERING GOLD FROM ITS ORES

Filed Nov. 23, 1936

GOTTHOLD H. MEINZER
INVENTOR

ATTORNEY

Patented Apr. 4, 1939

2,152,748

UNITED STATES PATENT OFFICE 2,152,748

METHOD OF RECOVERING GOLD FROM ITS ORES

Gotthold Harry Meinzer, Glendale, Calif.

Application November 23, 1936, Serial No. 112,364

8 Claims. (Cl. 209—52)

My invention pertains to the art of separating free gold or silver particles from crushed ores by amalgamation with metallic mercury.

In the attached drawing, which illustrates various features of my invention, the single figure is a diagram illustrating the direction of the eddy currents formed downstream of my improved suspended or "floating" riffle.

Riffle or sluice-box concentration and amalgamation are perhaps two of the oldest methods of recovering free gold, in general use. Both methods are simple and fairly efficient for recovering coarse gold particles, but very inefficient or entirely unsuitable for the recovery of "flour" gold.

The method herein described combines the basic principles of riffle concentration and amalgamation into an improved method that retains their simplicity with the added advantage of a high efficiency of fine gold recovery.

The principle of riffle concentration is the same as that governing natural concentration of gold values in stream beds, behind or adjacent to natural obstructions to the stream flow. The riffle in a sluice box is simply an artificial obstruction for the purpose of creating a vortex or eddy zone on the down-stream side and adjacent to the riffle. As the pulp carrying the gold particles flows over the riffle, the heavy metal particles lose their down-stream momentum as they swirl into the vortex zone and ultimately settle to the bottom of the sluice-box. However, to keep this settling pocket free of large or heavy particles of gangue minerals requires a nice adjustment of pulp density and flow rate. When black sands or other heavy minerals are present, it is impossible to keep the riffle pockets clear and they rapidly fill up to a streamline contour, vortex formation stops, and the riffle becomes inoperative.

Figure 2:
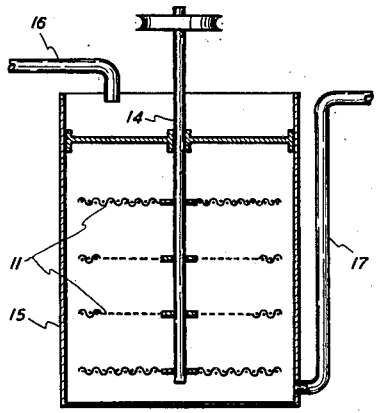
Figure 3:
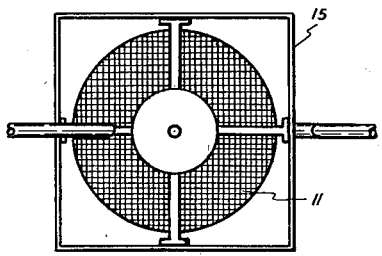
Figure 1:
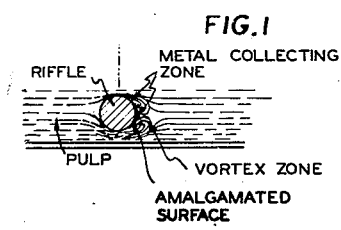

My method utilizes the vortex principle of concentration but eliminates the above mentioned disadvantages by suspending or "floating" the riffle in the pulp, thus allowing it to be completely surrounded by the fluid. This method, illustrated at B in Fig. 1, has numerous advantages, for example, both upper and lower side of the floating riffle is effective in vortex formation, yielding a double vortex, which has been shown by stroboscopic examination to be much more effective as a quiescent or concentrating zone than the vortices formed by a riffle attached along its lower surface.

Another advantage of the suspended riffle is that in order to produce the vortex zone we may mechanically move the riffle through the pulp instead of flowing the pulp in relation to the riffle. This makes possible much better control of vortex formation by adjusting flow-rates around the riffle. The outstanding advantage of this type of riffle is that the space or pocket behind the riffle cannot become choked or blinded, since the fluid and mineral contents of the vortex zone are continually being renewed as the riffle moves or the pulp flows. No accumulation of unattached particles can take place in this zone.

The well known method of "plate" amalgamation with its various modifications depends for its effectiveness on a clean mercury surface and sedimentation of the gold particles through the film of flowing pulp into contact with the amalgamated surface, conditions difficult to maintain in practice. Since the mercury is spread out over a large flat surface, surface tension forces naturally tend to produce "flouring" of the mercury and its loss from the plate. Unless the pulp density and rate of flow are properly adjusted "scouring" of the amalgam takes place. Oil or other soluble organic matter forms a film over the plate and prevents the gold particles from amalgamating. In my method the above difficulties are obviated in the following manner:

(a) By amalgamating the surface of the suspended riffle, described above, I do not depend on sedimentation to bring the gold particles into contact with the amalgamated surface, since the gold particles entrained in the eddies and vortices formed by the riffle are dynamically projected against the amalgamated surface.

(b) By making the mercury surface a closed curve (for example a circular cross section) the surface tension forces are in equilibrium and tend to maintain a uniform distribution over the whole surface, with no tendency to "flouring".

(c) "Scouring" of the gold amalgam does not take place because the amalgam forms in the vortex or quiescent zone where it is screened from the scouring action of the pulp stream.

To sum up the foregoing—my method of recovering gold or precious metal particles suspended in a pulp, consists in concentrating the gold particles in a zone of eddies or vortices by means of a suspended "riffle", such zone of eddies to be formed around or in proximity to an amalgamated surface for the purpose of holding the precious metal particle and prevent its escape into the body of pulp. The zone of eddies or vortices may be formed either by mechanically moving the riffle with respect to the pulp or flowing the pulp with the riffle stationary.

I have found by experiment that the most efficient form of combined riffle or vortex generator and amalgamating surface is a series of interlacing amalgamated wires, such as a wire mesh screen. A very uniform and stable vortex zone is generated by rotating such an amalgamated screen surface in the pulp around an axis at right angles to its surface or by moving such amalgamated screen mechanically through the pulp in a direction at right angles to its surface. To illustrate the operation of this method I will describe a laboratory test:

The apparatus used consists of a 2½ inch diameter amalgamated screen riffle, made of ⅛ inch diameter amalgamated wires spaced 3/16 inch. This disc was fixed concentrically in a horizontal plane to a rotatable vertical shaft that extended into the body of pulp to be treated.

Ore_____200 gms. ground to pass 200 mesh
Pulp density_____1 part ore, 3 parts water
Rotation_____400 R. P. M.
Time of treatment____5 minutes
Heads assay_____$6.10 gold
Tails assay_____$0.73 gold
Recovery_____88 per cent As evidence that the "riffle" action is necessary, I have found that below a certain critical speed of rotation no appreciable recovery is obtained. This critical velocity must be determined by experiment, but is probably the velocity necessary for turbulent flow.

Further proof that vortex formation is an essential factor in my method, is given by the following experiment:

In place of the amalgamated screen disc used in the above test I used a solid amalgamated copper disc of the same diameter, ⅛ inch thick, and repeated the test exactly as above. No recovery of gold was made. All available rotational speeds were tried from 50 R. P. M. to 1000 R. P. M. It was found by microscopic examination that no gold particles whatever adhered to the flat surfaces of the solid disc. However, above 600 R. P. M. particles of gold were found adhering to the edge of the disc, where a limited zone of turbulence was to be expected.

It will be evident that the principles above laid down may be given various mechanical applications. Thus in Figs. 4 and 5 the circular screens 11 are mounted on a vertical shaft for revolution in their major plane. The tank 15 is preferably square in plan to prevent too rapid revolution of the contents of the tank. The gold-bearing pulp is fed into the tank over the top, as by the pipe 16 and the tailings are discharged by a siphon pipe 17 arranged to maintain a constant liquid level in the tank.

It will be understood that the use of woven wire screens is a preference only, as being comprised of cylindrical members arranged in a convenient manner for self support and stiffness. A less satisfactory result may be obtained by means of wires or rods radiating from a hub or stretched between a rim of sufficient stiffness to retain them in position, this form displaying a tendency to radial displacement of vortex zones due to centrifugal force, by which its amalgamating efficiency is reduced. The screen has the further advantage over other forms in that the points of contact of the interlacing wires serve to retain minute pools or reservoirs of mercury and it thus is possible to amalgamate more heavily without loss of mercury than is possible with other forms.

The rods or wires must of course be of a metal which amalgamates with mercury and will preferably be of copper. They should be thinly coated with mercury so that the liquid metal will not be thrown off by centrifugal force. When a sufficient quantity of the precious metal or metals has accumulated the screens may be withdrawn and the amalgam washed off with an excess of mercury, or the wire screen may be placed in a retort from which the mercury is distilled, after which the precious metal may be brushed off and the screen reamalgamated.

I claim as my invention:

1. The method of recovering gold or silver from an ore pulp containing the free metal which comprises: producing relative movement of said ore pulp over a suspended, substantially plane surface of mercury coated woven wire screen in a direction substantially parallel to said plane and at a relatively high velocity sufficient to produce vortices on the trailing side of the wires composing said screen, and simultaneously producing a relatively slow movement of said pulp in a direction normal to said plane.

2. Apparatus for recovering gold or silver from an ore pulp containing the free metal which includes a container for said pulp, a disc formed of spaced apart wire members coated with mercury some of said wire members being disposed in a substantially radial direction, means for suspending and for rapidly rotating said disc in its own plane within said container thereby forming vortices on the trailing side of the radially extending wires of the disc, and means for flowing said pulp through said container and said disc of wire in a direction transverse to the plane of said disc.

3. Apparatus for recovering gold or silver from an ore pulp containing the free metal which includes a container for said pulp, a disc formed of radially disposed relatively spaced apart wire members coated with mercury, means for suspending and for rapidly rotating said disc in its own plane within said container and the pulp contained therein thereby forming vortices on the trailing sides of the radially disposed wires, and means for charging and discharging said container.

4. The method of recovering gold or silver from an ore pulp containing the free metal which comprises; producing relative movement of said ore pulp over a suspended, substantially plane surface of wire screen in a direction substantially parallel to said plane and at a velocity sufficient to produce vortices on the trailing side of the wires composing said screen.

5. The method of recovering gold or silver from an ore pulp containing the free metal which comprises: freely suspended and laterally moving an amalgam coated metallic filament through a bath of said pulp at a velocity sufficient to cause the formation of a vortex on the trailing side of said filament.

6. The method of recovering gold or silver from an ore pulp containing the free metal which comprises: rotating in a bath of said pulp a plurality of substantially radially disposed amalgam coated metallic filaments spaced apart and arranged in a common plane, in a direction substantially parallel to said plane and at a velocity sufficient to cause the formation of vortices on the trailing sides of radially disposed filaments.

7. The method of recovering gold or silver from an ore pulp containing the free metal which comprises effecting relative lateral movement between a freely suspended amalgam coated metallic filament and a bath of said pulp at a velocity sufficient to cause the formation of vortices on the trailing side of said filament.

8. Apparatus for recovering gold or silver from an ore pulp containing the free metal which includes a container for said pulp, an open work grid suspended in said container, said grid being coated with mercury and having through passages and radially extending and relatively spaced apart slender division portions separating said passages and avoiding substantial areas of abraiding contact between the grid and the ore pulp, and means for creating rapid relative lateral movement between the grid and the ore pulp thereby forming vortices on the trailing side of said slender division portions.

GOTTHOLD HARRY MEINZER.